2,816,833

WET STRENGTH PAPER

Leopold F. Bornstein, Wilmington, Del., assignor to Synvar Corporation, Wilmington, Del., a corporation of Delaware No Drawing. Application June 22, 1954,
Serial No. 438,589

5 Claims. (Cl. 92—3)

This invention relates to the manufacture of paper, and more particularly to the manufacture of wet strength paper. The invention also includes the improved paper product and a composition useful in the manufacture of same.

Wet strength paper because of its evident advantage of retaining a substantial amount of strength when wet with water is a much desired manufacture. Production of wet strength paper is increasing in volume and in commercial importance and as a result wet strength paper is rapidly moving out of the so-called specialty class of papers.

Wet strength paper has been made heretofore by incorporating melamine-formaldehyde resin or urea-formaldehyde resin into the watery pulp during the paper manufacturing process. Melamine-formaldehyde resin when incorporated into the paper produces a paper having a very high wet strength. However, melamine-formaldehyde resin when employed in the manufacture of wet strength paper presents certain difficulties and disadvantages. For example, in order to obtain optimum results melamine-formaldehyde resin can only be added at a certain stage of the paper manufacture, at the pump supplying the head box of the paper making machine. When the resin is added at another stage, such as at the beater, an inferior wet strength paper is produced. Also the melamine-formaldehyde resins are not available as commercial products, and the solution must be prepared as desired prior to addition to the paper stock. This preparation of the melamine-formaldehyde resin solution is bothersome and entails an aging period. Sometimes mistakes in the formulation or the procedure of preparation of the resin solution result in an unusable resin solution. Also paper made with melamine-formaldehyde resin is difficult to rework and recover unless it is subjected to a rather complicated treatment prior to reworking in order to remove as much of the resin as possible. Furthermore melamine-formaldehyde resin is expensive and, therefore, the cost of wet strength paper incorporating this resin is greatly increased. As a result wet strength paper prepared therewith is limited only to those applications wherein the cost of the paper is not important.

Urea-formaldehyde resin for producing wet strength paper is available in two types, the so-called anionic and cationic types. These types of urea-formaldehyde resin however are distinctly inferior to melamine-formaldehyde resin when employed in the manufacture of wet strength paper. Wet strength paper prepared from urea-formaldehyde resin retains an objectionable formaldehyde odor for a long time, depending upon how the paper is cured. Additionally urea-formaldehyde wet strength paper has the disadvantage in that many people are allergic to this type of resin and develop dermatitis. Also, urea-formaldehyde resin has only a limited storage life and must be used within a few months.

It is an object of this invention to provide a method for producing a wet strength paper wherein the material which imparts the desired wet strength characteristic to the paper can be added at any desired step in the paper manufacture.

It is another object of my invention to provide a material which is useful in producing wet strength paper and which is capable of almost indefinite storage without deterioration.

It is another object of my invention to provide an improved method for the manufacture of wet strength paper.

It is still another object of this invention to produce an improved wet strength paper.

These and other objects of this invention and how they are accomplished will become apparent in the light of the accompanying disclosure.

The present invention is based on my discovery that quebracho extract is useful in the preparation of a wet strength paper. Quebracho extract can be used to impart wet strength properties to paper produced from cellulose pulp, bleached or unbleached, and prepared by any of the well-known methods of preparing paper pulp, including the kraft, sulfite, soda, groundwood and other methods. The process will be described hereinafter more particularly by reference to the use of quebracho extract.

The quebracho extract may be added to the pulp, after digestion of the wood or other cellulose material to release the cellulose and after bleaching, at any step in the manufacture of the paper. For example, in accordance with my invention, the quebracho extract can be added to the pulp or water-pulp slurry as it is being fed to the beaters or to the pulp in the beaters or at the Morden or Jordan refiners, or at the pump supplying the pulp from the Jordan machine stuff box to the head box of the paper making machine. It is of course preferred to add the quebracho extract to the pulp at a step in the paper making process wherein it is assured that the pulp will be intimately and uniformly admixed with the added quebracho extract. Preferably the quebracho extract is added at the beater or to the pulp immediately before it is pumped to the head box which supplies the pulp to the paper making machine.

Quebracho extract is available as a liquid or solid extract from the heartwood of quebracho. The commercial liquid quebracho extract contains 35 to 65% by weight quebracho extract, usually about 40% quebracho extract. The exact composition of quebracho extract is not completely established, but it is known to contain various natural tannins and other derivatives of such polyhydric aromatic compounds as the dihydroxybenzenes, including pyrocatechol and resorcinol; the trihydroxy benzenes such as pyrogallol, and alkyl-substituted phenols such as xylenol. It has also been stated that the principal tannin material present in the natural tannins is either diagolloyl glucose or penta digalloyl glucose.

Although quebracho extract as supplied commercially, imparts satisfactory wet strength properties to paper, the wet strength properties are further improved by increasing the pH of the aqueous liquid containing the quebracho extract, which is usually in the range 5.0–6.0, to a value in the range about 8.0–9.0 by the addition of a suitable alkaline acting compound such as sodium or potassium hydroxide. Additionally, a still further improvement in the wet strength properties of paper prepared with the use of quebracho extract can be achieved by adding a minor amount of formaldehyde, e. g., in the form of liquid commercial 40% formaldehyde, to the aqueous alkaline solution of quebracho extract prior to the addition of the quebracho extract to the paper pulp. Although I do not intend to be bound by any theory as to why a further improvement results from the addition of formaldehyde, this may be explained as due to chemical reactions, probably in the nature of condensations which take place between tannin constituents of the quebracho extract and the formaldehyde, producing reaction products that are even more effective than quebracho extract alone in imparting wet strength properties to paper. To the extent that the reactions between formaldehyde and the quebracho extract constituents take place in the presence of the cellulose pulp, there is also a greater opportunity for a bonding action between the reaction products and the cellulose fibers.

The use of quebracho extract to impart wet strength properties to paper offers a number of advantages. Quebracho extract is stable and therefore no storage problems arise due to instability during storage, as in the case of the melamine- and urea-formaldehyde resins. The cost of quebracho extract is much lower than that of melamine-formaldehyde resin, and even lower than that of urea-formaldehyde resin. Consequently paper made with the use of quebracho extract as a wet strength additive is relatively less expensive.

The amount of quebracho extract required to be added to the pulp in order to impart wet strength properties to the paper manufactured therefrom is always relatively small. Usually a proportion in the range 0.5 to 3.0% by weight of the pulp, based on the cellulose content, and preferably in the range 1.0 to 2.0%, will be used. The amount of formaldehyde which may be added further to improve the wet strength properties of the paper is usually varied in proportion to the amount of quebracho extract in the range 5-25%, preferably 10-20%, by weight based on the quebracho extract itself, or in the range 0.025 to 0.75% by weight based on the actual cellulose content of the resulting admixture.

For a further understanding of the invention the following examples are presented. Wet strength paper was produced by various methods in accordance with the teachings of this invention. In manufacturing the paper a paper beater, No. 1½ Niagara Beater manufactured by the Valley Iron Works Co., was employed. A paper sheet making machine of the Williams type was employed as well as a Williams drier and press. These machines are well known in the paper-making trade.

*Example 1*

Three hundred and sixty grams of Purayonier pulp were beat for five minutes at 5,500 grams bedplate weight. The beating was then continued for an additional 2.5 minutes. About 11 grams of alum were then added to the pulp slurry in the beater to bring it to a pH of about 4.5 to 5.5 followed by further beating for five minutes. Eleven grams of liquid commercial quebracho extract (40% strength), was then added to the beater. The pH was then brought up to 8.2 by the addition of sodium hydroxide, and the beating then continued for an additional 5 minutes. Thirteen grams of pulp were then removed from the beater and formed into a sheet 0.02" thick. The sheet was squeezed out in the press under a pressure of 50 pounds per square inch and dried in the dryer at a temperature of 250-275° F. for 7-10 minutes. The paper produced exhibited the following bursting strengths when tested on the Perkins Mullen tester:

P. s. i. g.
Dry Mullen, avg_____ 200
Wet Mullen_____ 25

In this and the succeeding examples the "Wet Mullen" refers to test of the paper after 60 minutes immersion in water at room temperature. The "wet tensile" tests referred to in certain examples also relate to tests after 60 minutes immersion in water.

*Example 2*

The same procedure as set forth in Example 1 was followed only in this case 17 grams of liquid commercial 40% strength quebracho extract, the pH of which was brought up to 8.5 by the addition of sodium hydroxide and to which 2.5 grams of liquid commercial 40% formaldehyde was added, was prepared. An amount of quebracho solution equal and equivalent to the amount of the resulting quebracho extract added to the beater in Example 1 was then added to the beater. The paper produced exhibited the following physical properties:

Dry Mullen, avg_____p. s. i. g__ 250
Wet Mullen_____p. s. i. g__ 70
Tensile strength, dry_____p. s. i__ 80
Tensile strength, wet_____p. s. i__ 30

*Example 3*

The same procedure as set forth in Example 2 was followed, except in this case solid quebracho extract was dissolved in water and sodium hydroxide and formaldehyde was added to produce a quebracho extract solution of the same strength as employed in Example 2 and containing the same amount of quebracho extract as was added to the beater in Example 2. The paper produced exhibited the following bursting strengths when tested on the Perkins Mullen Tester:

P. s. i. g.
Dry Mullen, avg_____ 230
Wet Mullen _____ 65

*Example 4*

The same procedure as set forth in Example 3 was followed, except that instead of Purayonier pulp, 310 grams of kraft paper was reconverted into pulp and this pulp was used. The treated pulp was formed into sheets 31" sq. and 0.033" thick. The paper produced exhibited the following physical properties:

Dry Mullen, avg_____p. s. i. g__ 285
Wet Mullen_____p. s. i. g__ 105
Tensile strength, dry_____p. s. i__ 270
Tensile strength, wet_____p. s. i__ 120

*Example 5*

The same procedure as set forth forth in Example 4 was followed except that 5 grams of dry rosin size, as manufactured by Hercules Powder Co., was also added to the beater. The paper produced exhibited the following physical properties:

P. s. i. g.
Dry Mullen, avg_____ 225
Wet Mullen_____ 70

*Example 6*

For purposes of comparison wet strength paper was prepared from Purayonier pulp (a bleached pulp) by incorporating therewith only an amount of urea-formaldehyde resin of the anionic and the cationic types equal in weight to the amount of quebracho extract employed in each of the other examples. The procedure for manufacturing the paper was otherwise the same and the resulting paper exhibited the following physical properties:

|  | Anionic | Cationic |
|---|---|---|
| Dry Mullen, avg_____p. s. i. g__ | 215 | 215 |
| Wet Mullen_____p. s. i. g__ | 30 | 55 |
| Tensile strength, dry_____p. s. i__ | 65 | 75 |
| Tensile strength, wet_____p. s. i__ | 20 | 25 |

It is evident from a comparison of the data set forth in the foregoing examples that wet strength paper prepared in accordance with this invention, employing quebracho extract and formaldehyde, was superior in all respects to the wet strength paper produced from urea-formaldehyde resins. For example, as indicated by Example 4, wet strength paper prepared according to the teachings of this invention exhibited a wet Mullen value and a wet tensile strength value 133% and 50%, respectively, greater than the values for wet strength paper produced from anionic urea-formaldehyde resin in accordance with Example 6.

I claim:

1. A wet strength paper having incorporated therein prior to sheet formation, at an alkaline pH, 0.5 to 3.0 percent of quebracho extract and 0.02 to 0.75 percent of formaldehyde, said percents being based by weight on the cellulose content of said paper.

2. A wet strength paper having incorporated therein prior to sheet formation, at an alkaline pH range of 8 to 9, 0.5 to 3.0 percent quebracho extract and 0.02 to 0.75 percent of formaldehyde, said percents being based by weight on the cellulose content of said paper.

3. An improvement in the method for the manufacture of wet strength paper which comprises adding, at an alkaline pH range, 0.5 to 3.0 percent of quebracho extract and 0.025 to 0.75 percent of formaldehyde to said paper while in a slurry form prior to sheet formation, said percents being based by weight on the cellulose content of said paper.

4. A method as described in claim 3 wherein said quebracho extract and said formaldehyde are mixed prior to addition to said slurry, and said pH range is 8 to 9 and is obtained by adjusting the pH of the mixture of quebracho extract and formaldehyde prior to addition to said slurry.

5. A method as claimed in claim 3 wherein said pH range is 8 to 9 and is obtained by adjusting the pH of said slurry.

References Cited in the file of this patent

UNITED STATES PATENTS

| | | |
|---|---|---|
| 71,893 | Lowrey | Dec. 10, 1867 |
| 1,105,195 | Varley | July 28, 1914 |
| 1,160,362 | Baekeland | Nov. 16, 1915 |
| 1,280,400 | Clapp | Oct. 1, 1918 |
| 2,010,635 | Kantorowicz | Aug. 6, 1935 |
| 2,286,643 | Phillips | June 16, 1942 |
| 2,338,602 | Schur | Jan. 4, 1944 |
| 2,622,960 | Woods et al. | Dec. 23, 1952 |

FOREIGN PATENTS

| | | |
|---|---|---|
| 1,587 | Great Britain | of 1863 |
| 26,445 | Great Britain | Nov. 13, 1908 |
| 474,361 | Great Britain | Oct. 25, 1937 |
| 597,387 | Great Britain | Aug. 1, 1946 |

OTHER REFERENCES

Report on the Third International Conference on Timber Utilization, Paris, July 26–28, 1937; No. 16/17 special number; p. 95.

Collins, Paper Ind. & Paper World, June 1943, pp. 265 and 267.

The Condensed Chemical Dictionary, 4th ed., published by Reinhold Pub. Corp., New York, N. Y., 1950; p. 645.